United States Patent [19]
Shiga et al.

[11] Patent Number: 6,078,116
[45] Date of Patent: Jun. 20, 2000

[54] ALTERNATOR FOR VEHICLE

[75] Inventors: Tsutomu Shiga, Nukata-gun; Atsushi Umeda, Okazaki; Shin Kusase, Obu, all of Japan

[73] Assignee: Denso Corporation, Kariya, Japan

[21] Appl. No.: 09/200,598

[22] Filed: Nov. 27, 1998

[30] Foreign Application Priority Data

Nov. 27, 1997 [JP] Japan ..................................... 9-325907
Jul. 29, 1998 [JP] Japan .................................. 10-214474

[51] Int. Cl.⁷ ...................................................... H02K 9/06
[52] U.S. Cl. ........................... 310/60 R; 310/58; 310/263
[58] Field of Search ................................. 310/263, 49 A, 310/194, 208, 261, 164, 179, 180, 195, 49 R, 60 R, 58, 59, 61, 201, 89

[56] References Cited

U.S. PATENT DOCUMENTS

| | | | |
|---|---|---|---|
| 4,757,221 | 7/1988 | Kurihashi et al. ........................ | 310/62 |
| 5,021,696 | 6/1991 | Nelson ....................................... | 310/62 |
| 5,028,826 | 7/1991 | Kitamura .................................... | 310/51 |
| 5,097,167 | 3/1992 | Kanayama et al. ...................... | 310/201 |
| 5,329,199 | 7/1994 | Yockey et al. ........................... | 310/263 |

FOREIGN PATENT DOCUMENTS 5-219685  8/1993  Japan ............................... H02K 9/04

*Primary Examiner*—Thomas M. Dougherty
*Assistant Examiner*—Burton S. Mullins
*Attorney, Agent, or Firm*—Pillsbury Madison & Sutro LLP

[57] ABSTRACT

An alternator for a vehicle includes a field rotor having a pair of pole cores with a plurality of claw poles, a stator disposed around the rotor, and a frame for supporting the rotor and the stator. The frame has a plurality of air intake windows at axial ends thereof and a plurality of air discharge windows at circumferential portions thereof. The rotor has a cooling fan with a plurality of fan blades disposed at one end of the pair of pole cores. The number of the blades is smaller than the number of the claw poles.

12 Claims, 11 Drawing Sheets

ALTERNATOR FOR VEHICLE

CROSS REFERENCE TO RELATED APPLICATION

The present application is based on and claims priority from Japanese Patent Applications Hei 9-325907 filed on Nov. 27, 1997, and Hei 10-214474 filed on Jul. 29, 1998, the contents of which are incorporated herein by reference.

BACKGROUND OF THE INVENTION

1. Field of the Invention

The present invention relates to an alternator for a vehicle such as a passenger car or a truck.

2. Description of the Related Art

Because engine noises have been reduced in order to comply with the social demand of reducing noises outside and inside cars, fan noise of the alternator becomes comparatively loud and harsh.

On the other hand, the engine compartment has become narrower due to a slanted-nose-vehicle for improving driver's visibility and vehicle running resistance, and a tendency to increase in the passenger compartment of the vehicle. This causes a temperature rise of the engine compartment and the alternator, thereby increasing power loss of the alternator. Moreover, the alternator is required to increase the output power for safety devices and the like with a limited size and being mounted in a limited space. The size of cooling fan can not be increased because of increase in noise.

Therefore, it is necessary to provide a noise-reduced, small and powerful alternator for a vehicle to be used under high-temperature circumferences, at low production cost.

In general, to obtain an increase in the magnetomotive force, improvement in the magnetic circuit and a pair of inner cooling fans fixed to opposite ends of pole cores are the basic way of providing a small and powerful alternator. In such an alternator, fan noise is caused by interference of radially moving cooling air with the coil ends of the stator and by the fan in cutting air.

JP-U-3-7648 discloses a cooling fan that can reduce fan noise. In such a cooling fan, a plurality of fan blades are disposed circumferentially at different intervals to disperse frequencies of noises caused by interference of cooling air with coil ends of the stator and to reduce noises by providing the fan blades with curved surface that inclines to the counter-rotating-direction. Because one or two of the fan blades of the cooling fan is or are disposed at each of the claw poles of the pole cores, a comparatively a large number of small blades generate turbulent air flow, and the intended effect thereof can not be expected sufficiently. To the contrary, the cooling air can not flow smoothly, thereby decreasing the quantity thereof to allow temperature rise of the alternator. Thus, it becomes difficult to make the alternator compact and powerful.

SUMMARY OF THE INVENTION

The present invention is to solve the above described problems and to provide a compact and powerful alternator for a vehicle that is low in noise, high in the cooling performance and reasonable in cost.

According to a main aspect of the present invention, an alternator for a vehicle includes a cooling fan having a small number of blades and a stator having coil-ends that are excellent at ventilation, cooling, and noise-screening. The cooling fan has a diameter smaller than the conventional cooling fans also.

Because the number of blades is small, the basic and resonant frequency of the noise is low so that the harsh noise can be reduced. Because each of the blades can have a wide surface, the cooling fan can provide smooth cooling-air-flow. Thus, the air-cutting noise can be reduced without sacrificing the cooling performance and durability.

According to another aspect of the present invention, each of the blades has a curved surface which inclines more to the rotating direction as the curved surface extends radially outward, and the width of the base portion of the curved surface is more than 30% of the outside diameter of the cooling fan.

Therefore, the cooling air can flow smooth around the blades. Generally, the rotating speed of the blade edge becomes higher as the diameter thereof increases, and the air flow can become more turbulent. The curved surface of such a width guides the air flow without turbulence. The blade edges can be aligned with the circumferential direction by use of the curved surface. Because the blades are processed to have the curved surface, the blades become hard and strong against the centrifugal force and vibration.

According to another aspect of the present invention, the inclination angle of the radially outer end of the blade to a radial direction is between 62° and 65°, and the inclination angle of the radially inner end of the blade to a radial direction is between 60° and 75°. Such blades can reduce collision loss at air intake portions of the blades and improve the fan efficiency $\eta$ expressed by theoretical-adiabatic-aerodynamic force/shaft-driving power.

According to another aspect of the present invention, the cooling fan of the alternator stated above has no rib both on the base member thereof fixed to the pole core and on the blades. The fan without ribs can reduce the turbulent flow around the fan and air-cutting noise. The rib-less structure simplifies the shape of the die for the fan, resulting in low die cost, long die life and, in turn, low production cost. The flat area of the base member increases the degree of freedom of using electrodes for a welder and of fixing tools, thus resulting in low production cost also.

According to another aspect of the present invention, the cooling fan of the alternator as stated above has a base member fixed to the axial end of the pole core. The base member has a cylindrical bell-mouth portion protruding toward the air intake windows. Accordingly, the air introduced in the axial direction from the intake windows is guided to flow in the radial direction to become smooth centrifugal air flow, so that the collision of the axial air flow and turbulent flow can be reduced.

According to further aspect of the present invention, the stator of the alternator as stated above has a cylindrical coil-end group composed of a plurality of coil ends disposed in a circumferential line spaced apart from one another to provide a plurality of circumferential cooling passages in the coil-end group at equal intervals. Therefore, the coil ends can be cooled effectively, and the collision of the air flow can be moderated, so that the resultant noise can be suppressed. The plurality of air passages function as a noise-absorbing group.

A plurality of coil ends are preferably aligned on a circumferential line to form the inner periphery of the coil-end group into a smooth cylindrical surface, so that partial interference with the air flow and resultant noise can be prevented.

A plurality of coil ends are disposed to cross one another in the circumferential direction to form mesh-patterns. Thus, the mesh-patterned coil-ends function as a sound absorption member.

Thus, the conductors of the stator coil can be disposed in a regular pattern to form the coil ends in a regular shape, which provides air passages in the coil-end group and improves a space factor of the conductors in the slots. As a result, resistance of the conductors can be reduced and the cooling performance is improved.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

Figure 1:
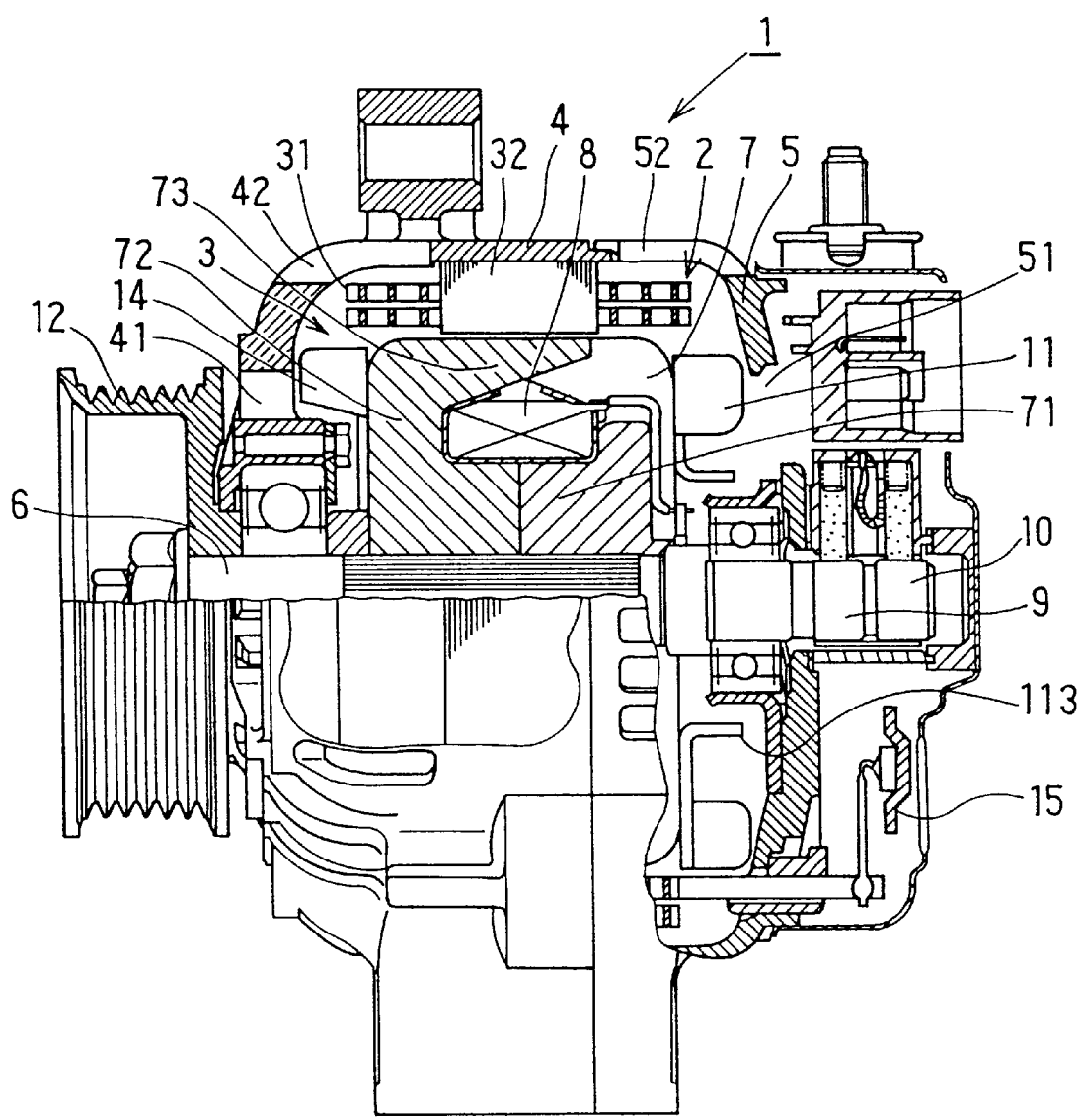
FIG. 1 is a cross-sectional view of a main portion of alternator for a vehicle according to a first embodiment.

An alternator according to a first embodiment of the invention is described with reference to FIGS. 1–10.

Alternator 1 is composed of stator 2 that functions as an armature, rotor 3 that function as a magnetic field, frames 4, 5 that support stator 2 and rotor 3, rectifier 15 that converts ac power of the stator to dc power, and others. Rectifier 15 is connected to a battery. Shaft 6 is connected to pulley 12 to be driven by an engine (not shown) mounted in a vehicle.

Each of a pair of pole cores 7 is composed of boss portion 71 fitted to shaft 6, disk portion 72 and eight claw poles 73. The pole core on the rear end of rotor 3 has cooling fan 11 and the pole core on the front end near pulley 12 has cooling fan 14. Cooling fan 11 has base member 112 fixed to the rear pole core and base member 142 of front cooling fan 14 is fixed to the front pole core, by welding or press-fitting. Cooling fans 11, 14 are press-formed from a metal plate to have six fan blades 111, 141 respectively and provide cooling air when rotor 3 rotates.

Figure 2:
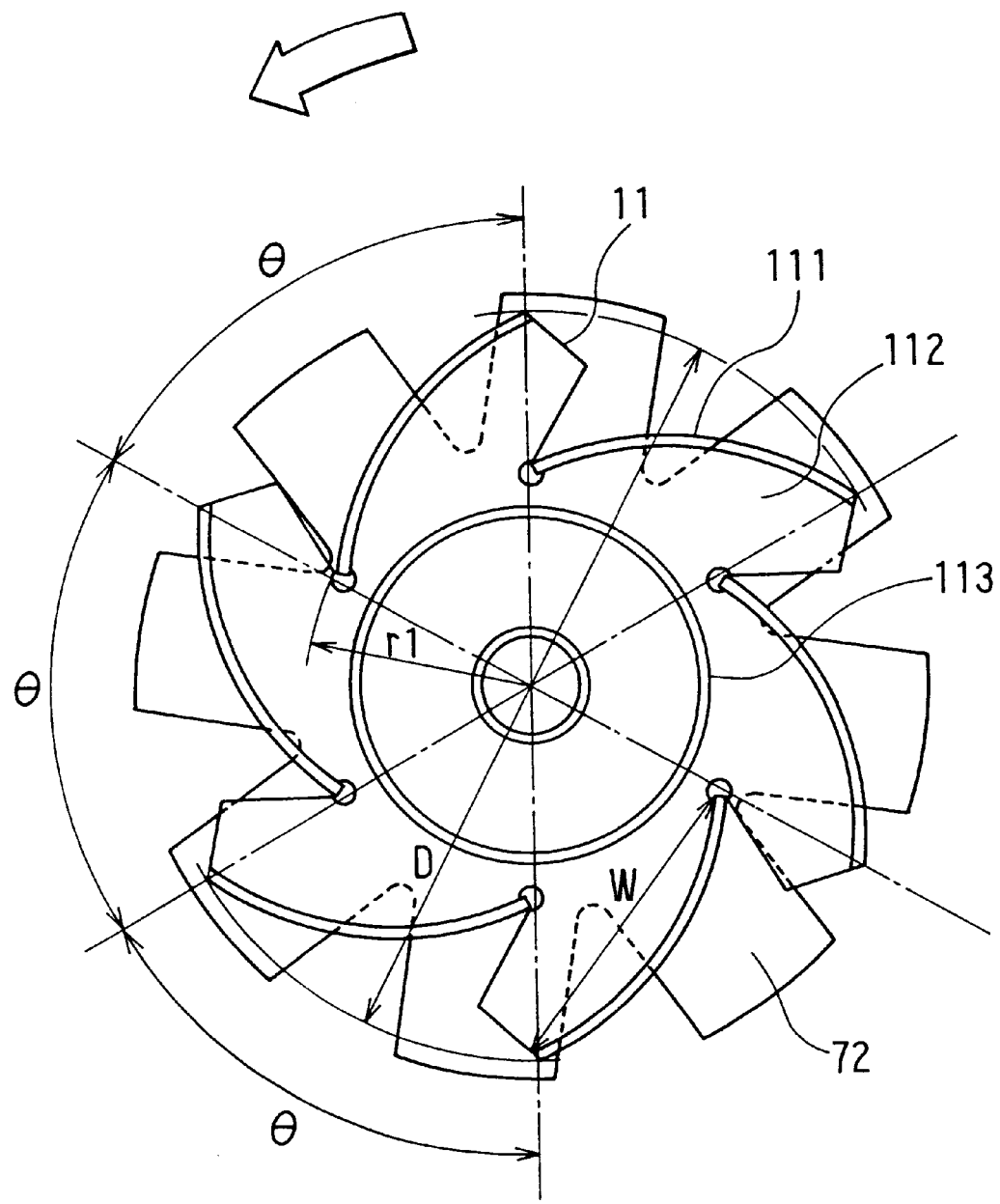
FIG. 2 is a front view of a front fan and a pole core of the alternator according to the first embodiment.
Figure 3:
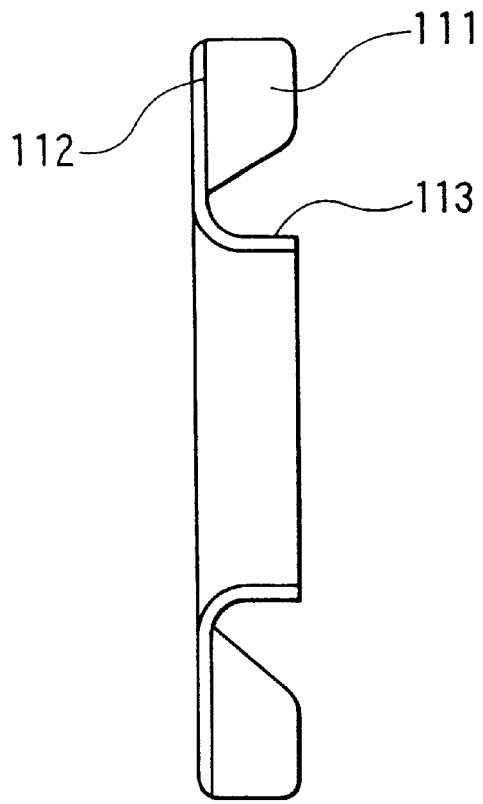
FIG. 3 is a cross-sectional side view of a rear fan of the alternator according to the first embodiment.

Six blades 111 are disposed on base member 112 at equal angles θ. Fan 11 has bell-mouth portion 113 at the center thereof to protrude rearward in the axial direction. As shown in FIGS. 2 and 3, bell-mouth portion 113 has a comparatively large radius and is connected to the inner periphery of base member 112. An arrow mark shown in FIG. 2 indicates the rotation direction of cooling fan 11. Each of blades 111 has a curved surface and an arc-shaped base portion. The outer edge of the blades extends in the counter-rotation direction, and the arc shaped base portion has width W—the chord length of the base portion—that is 42% of the outside diameter D of the fan. The width W is effective if the percentage is larger than 30%. The outside diameter of blades 111 is smaller than the outside diameter of pole core 7, and the ratio of the outside diameters is about 0.96. Each of blades 111 is located radially at the same distance from the rotation axis. The inner edge of blade 111 is located at distance r1 from the rotation axis. Distance r1 is about 60% of a half of the outside diameter D. Preferably, r1 is between 50% and 80% in view of the diameter of the bearing. Each of blades 111 is disposed on disk portion 72 across portions corresponding to neighboring two claw poles 73.

Figure 4:
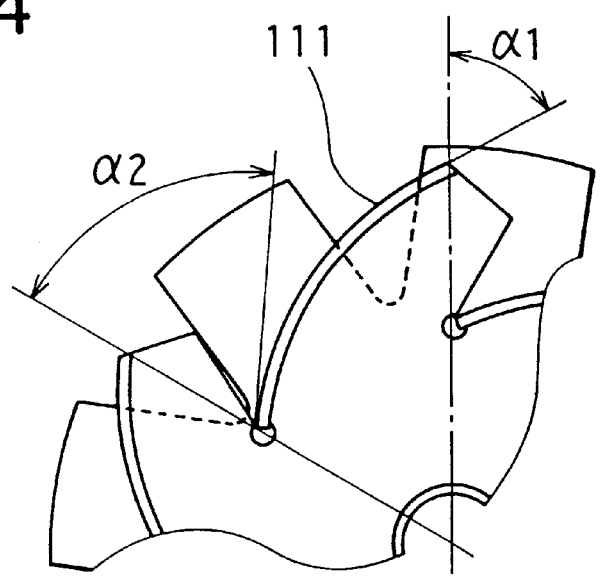
FIG. 4 is a fragmentary front view illustrating fan blades of the front fan of the alternator according to the first embodiment.

As shown in FIG. 4, the radially outer edge of blade 111 extends in a direction inclining by α1 such as 63° in angle to the radial direction thereof, and the radially inner edge of blade 111 extends in a direction inclining by α2 such as 72° in angle to the radial direction thereof.

Figure 5:
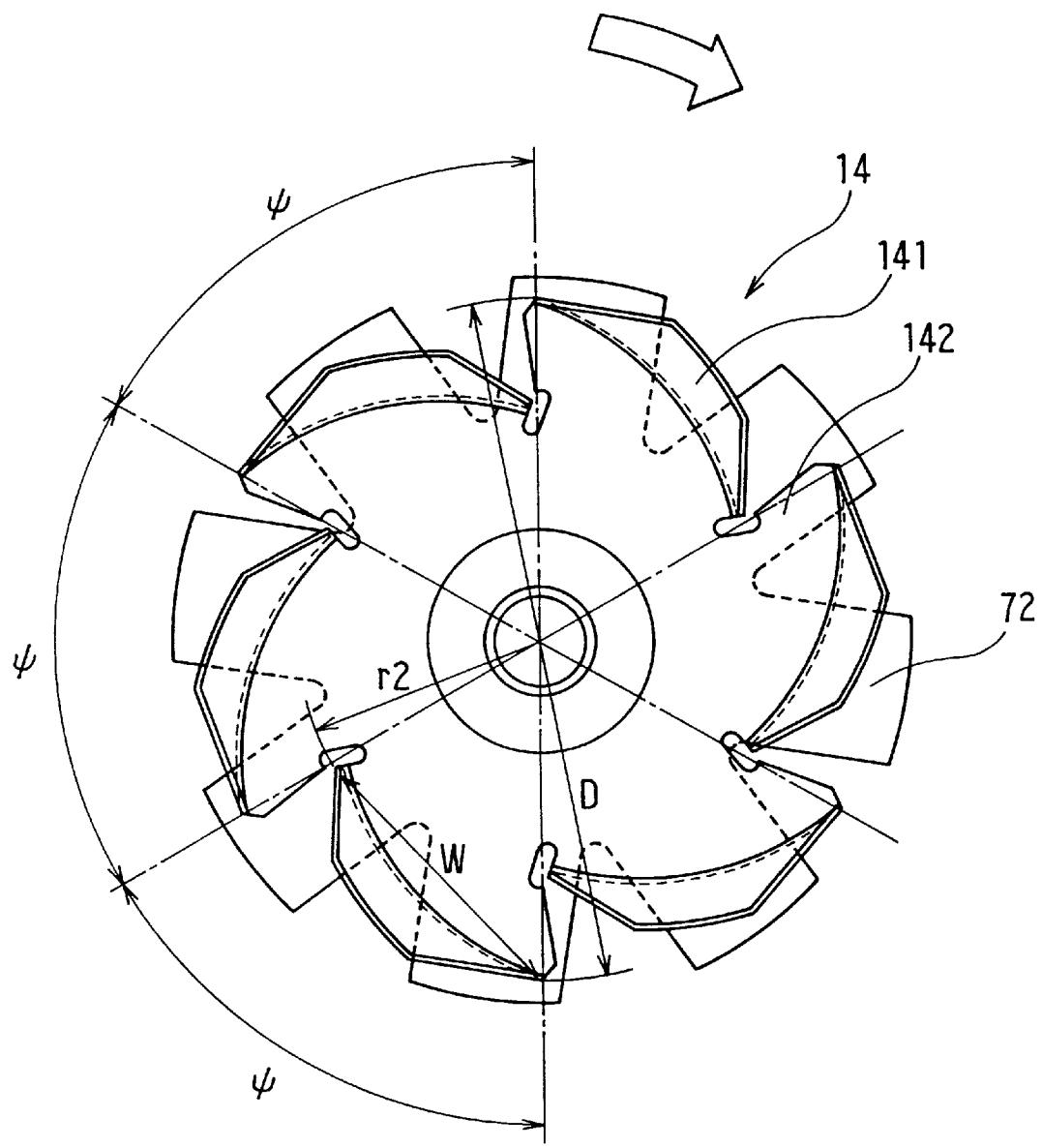
FIG. 5 is a front view of a rear fan and a pole core of the alternator according to the first embodiment.

As shown in FIG. 5, front fan 14 has six blades 141 disposed circumferentially at equal angles ψ. Each of blades 141 has a curved surface which extends from base member 142 axially forward and radially outward to have an acute angle with base member 142. The curved surface directs more to the counter-rotating direction of front fan 14 as it is located radially outward. Each of blades 141 has an arc-shaped base portion whose width (e.g. the chord length) W is about 42% of outside diameter D of the fan blades 141, and has radially outer and inner edges inclined respectively at angles 63° and 73° with the radial direction.

The outside diameter D of blades 141 is smaller than the outside diameter of pole cores 7, and the ratio of the outside diameter D to the outside diameter of pole cores is about 0.96. All blades 141 are located at the same distance from the rotation axis. The inner edge of blades 141 is located at a distance r2 from the rotation axis. The distance r2 is about 70% of the distance (D/2) of the outer edge from the rotation axis. Distance r2 is decided by taking comparatively a large diameter of the front or drive-side bearing into account. Each of blades 141 is disposed, in the same manner as blades 111, on disk portion 72 across portions corresponding to neighboring two claw poles 73.

Because blades 141 incline radially inward to the rotation direction, a portion of cooling air flows along the outer periphery of field coil 8 to cool the same. None of base members 112, 142 and blades 111, 141 has reinforcement ribs.

Frames 4, 5 have air intake windows 41, 51 at axially opposite ends thereof and air discharge windows 42, 52 at the circumferential portions opposite coil ends 31 of stator 2.

As shown in FIGS. 6, 7, 8, 9, and 10, stator 2 is composed of stator core 32, conductor segments 33 and insulators 34 for insulating the cores and conductors. Stator core 32 is a laminate of thin steel sheets and has a plurality of slots 35.

Figure 8:
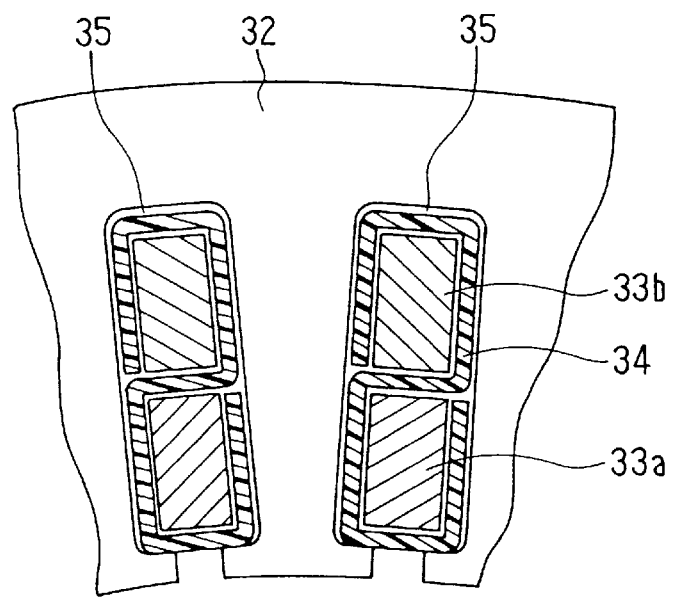
FIG. 8 is a fragmentary cross-sectional view of the stator of the alternator according to the first embodiment.

Each of conductor segments 33 is made from a straight conductor, which is shaped into a U-shape that has a U-turn portion at the middle and inner layer conductor 33a at one side thereof and outer layer conductor 33b at the other side thereof. Each of slots 35 has two four-cornered conductors therein, that is, inner layer conductor 33a and outer layer conductor 33b. Each of conductor segments 33 has also inclined portions 33e respectively in inner layer conductor 33a and outer layer conductor 33b. All inclined portions 33e of inner layer conductors 33a incline in one direction, and all inclined portions 33e of outer layer conductors 33b incline in the other direction, so that a certain spaces for insulation can be provided between inclined portions 33e. U-turn portions 33c are disposed on one end of stator core 32 so that one end of inclined portions 33e of inner and outer layer conductors 33a, 33b can be connected to another end thereof. Cooling fans 11, 14 and disk portions 72 of rotor 3 are disposed to face the coil ends. Conductor segments 33 have no insulation coating thereon. For insulation purposes, one of S-shaped insulators 34 is disposed in each of slots 35 between stator core 32 and the conductors and between the conductors as shown in FIG. 8. Conductor segments 33 can have insulation coating with insulators 34 being disposed in slots 35 only between the stator core and the conductors.

The manufacturing steps of the stator coil is described hereafter.

Figure 7:
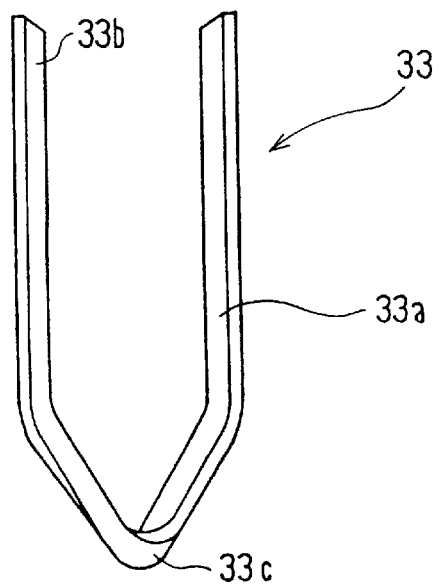
FIG. 7 is a perspective view of a conductor segment of the alternator according to the first embodiment.

A copper plate is bent and press-formed into a U-shape, thereby forming one of conductor segments 33 as shown in FIG. 7. Then, the outer and inner layer conductors are inserted respectively between parallel walls of different slots 35 via insulators 34 under pressure. Thus, a plurality of U-shaped conductor segments 33 are inserted to slots 35 in this manner so that U-turn portions 33c can be disposed on the same end of stator core 32. Thereafter, outer and inner layer conductors 33b, 33a are bent to extend in opposite circumferential directions so that each of outer layer conductors 33b can be connected to one of inner layer conductors 33a and each of inner layer conductors 33a can be connected to one of outer layer conductors 33b by an ultrasonic welder, an arc welder or a soldering device.

Thus, a plurality of conductor segments 33 are disposed in each of slots regularly to form a plurality of coil ends on the opposite ends of stator core 32 in a limited number of shapes without interference with one another. That is, a cylindrical coil-end group is composed of a plurality of regularly disposed coil ends. In other words, the plurality of coil ends are aligned circularly in two layers. As a result, the cylindrical coil-end group has a generally even inside cylindrical surface, outside cylindrical surface and axial length.

In the coil-end group, respective coil ends are spaced apart from one another and are distributed evenly on the circumferential direction, so that many air passages can be formed between the coil ends in the circumferential direction evenly. The inclined portions 33e of the inner layer conductor 33a cross the inclined portion 33e of outer layer conductor 33b, thereby forming a mesh pattern, and each of conductor segments 33 has a rectangular cross-section with longer radial sides to provide wide air passages along the radial direction. Thus, the coil-end group is effective in noise reduction as well as in cooling performance.

The number of blades 111, 141 of cooling fans 11, 14 is six (6), and the number of claw poles 73 of rotor 3 is eight (8). Therefore, the fan noise includes a noise frequency of six times as many as the basic noise frequency caused by rotating blades 111, 141. On the other hand, the noise caused by claw poles 73 includes a noise frequency of eight times as many as the basic noise frequency. Accordingly, amplification of the noises by each other can be prevented.

Figure 11:
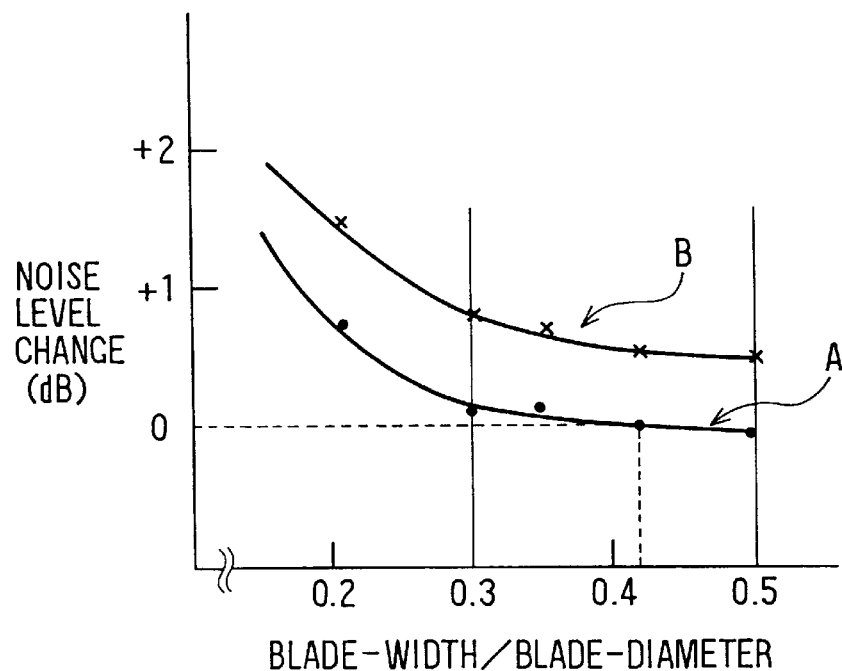
FIG. 11 is a graph showing relationship between noise levels and ratios of the outside diameter of the blades to widths of arc-shaped base portion of the blade.

The relationship between the various ratios of the width of the blade to the outside diameter (87 mm) of the blades and the change of noise levels at rotation speed of 12,000 rpm is shown in a graph in FIG. 11.

The noise levels are compared with a basic noise level with cooling fans 11, 14 whose outside diameter is 87 mm and blade width W is 42% of the outside diameter. Variations in level from the basic noise level are plotted on the graph. Curve A shows noise levels when the number of the blades is 6 and the number of the claw poles is 8, and curve B shows noise levels when the number of the blades is 7, and the number of the claw poles is 8.

As shown in FIG. 11, if the ratio of the width to the outside diameter is larger than 30%, the blades can have an area for guiding air flow sufficiently long and smooth to reduce the noise. Preferably, the ratio is larger than 40% to provide a minimum noise level. If blades 111 and 141 are press-formed, the maximum ratio is 50%.

Figure 6:
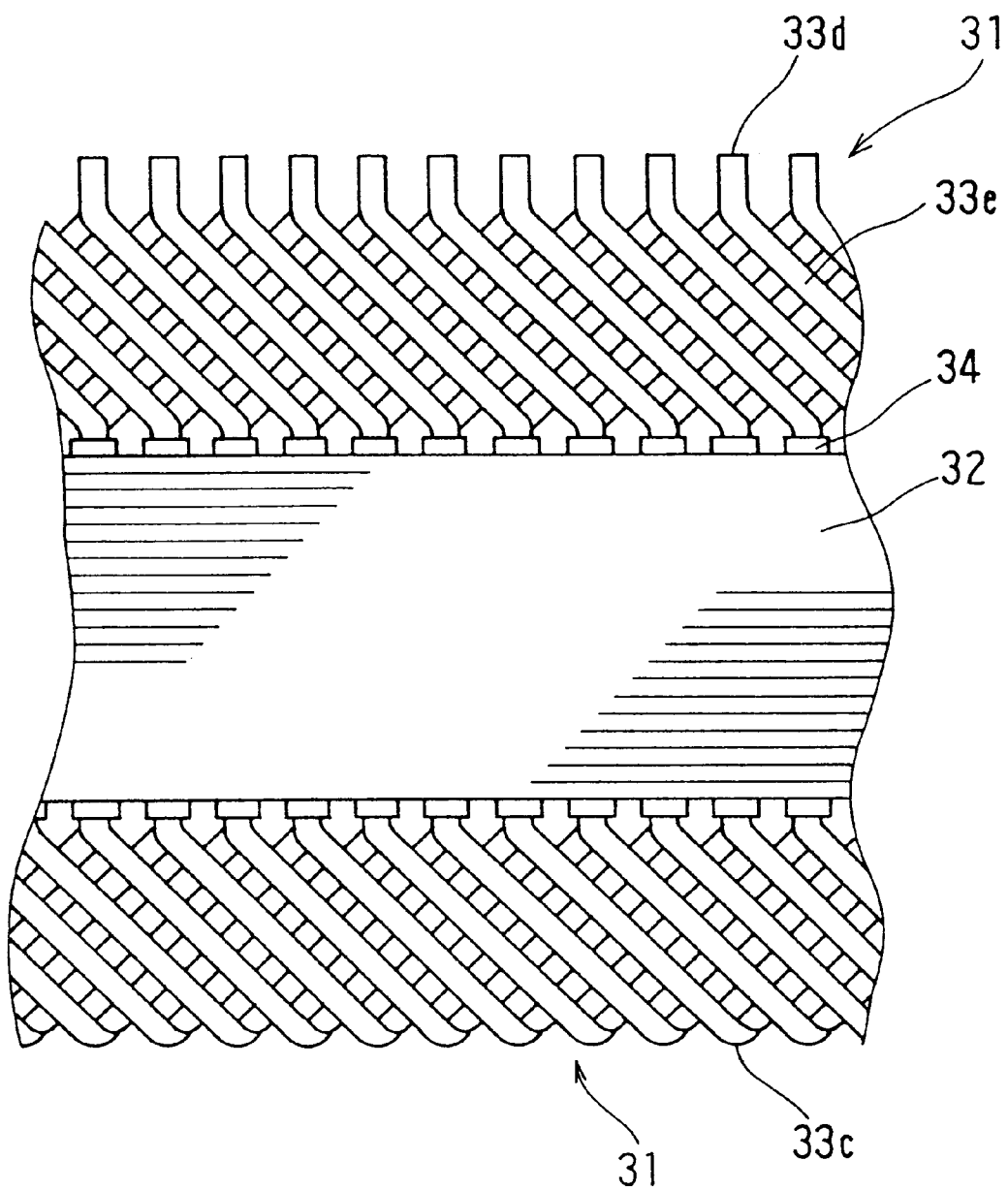
FIG. 6 is a fragmentary side view of a stator of the alternator according to the first embodiment.
Figure 9:
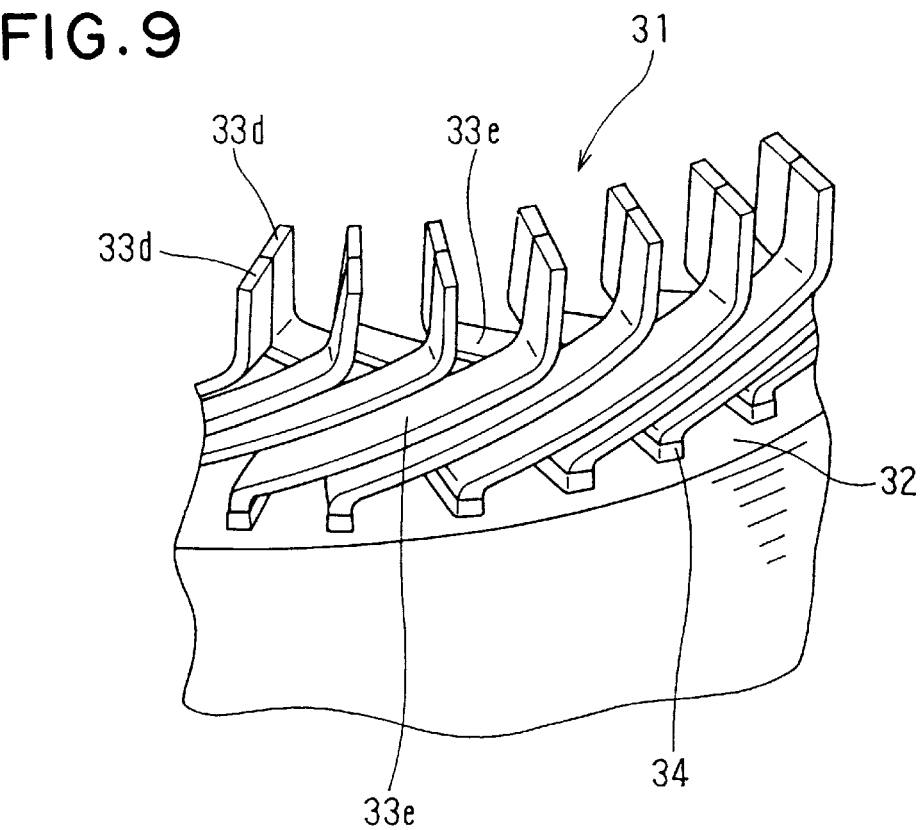
FIG. 9 is a fragmentary perspective view of the stator of the alternator according to the first embodiment.
Figure 10:
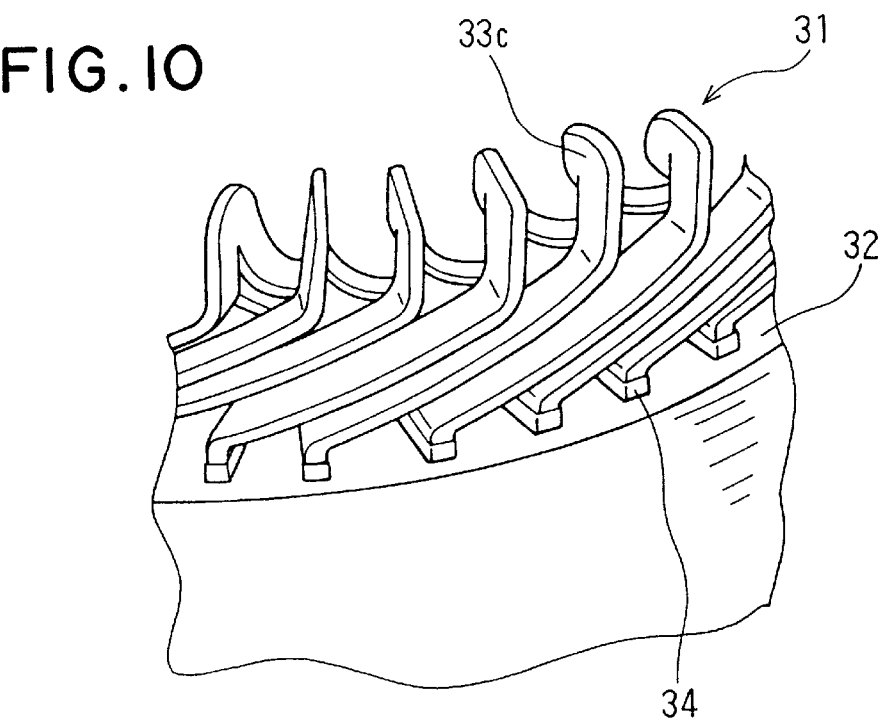
FIG. 10 is a fragmentary perspective view of the stator of the alternator according to the first embodiment.

As shown in FIGS. 6, 9 and 10, coil end 31 form a cylindrical coil-end group having a mesh pattern so that cooling air can penetrate coil ends 31. Because the cylindrical inner periphery of coil ends 31 is smooth, noise caused by the interference is drastically reduced and conductor segments 33 can be cooled effectively by a smaller quantity of air. Thus, the outside diameter of the blades 111, 141 can be reduced, and the distance between blades and coil ends 31 can be increased, so that the pressure fluctuation in the cooling air otherwise caused by rotation is moderated.

Figure 12:
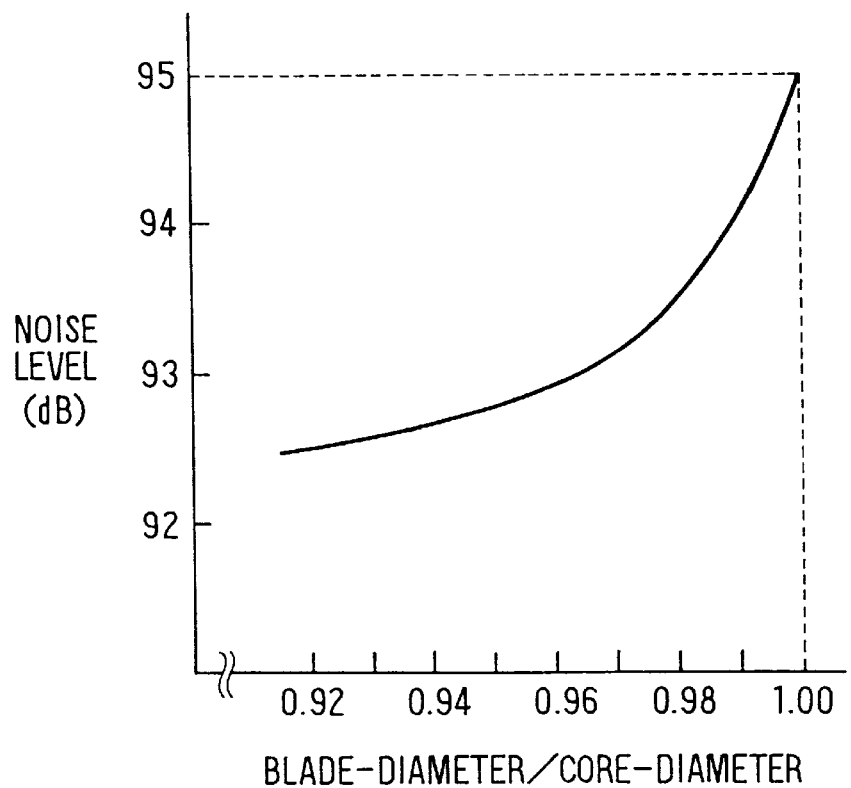
FIG. 12 is a graph showing relationship between ratios of the outside diameter of the blades to the outside diameter of the pole core and noise levels.

FIG. 12 shows variations in the noise levels of the cooling fan of a vehicle alternator which has pole core 7 of 91 mm in outside diameter rotating at 12,000 rpm. As the ratio of outside diameter of the blade to the outside diameter of the pole core 7 decreases from 0.99 that is the conventional level, the noise level decreases steeply and becomes gentle when the ratio becomes less than 0.96.

Because cooling fans 11, 14 have respectively six blades disposed at equal intervals, the outside diameter of cooling fans 111, 141 can be made smaller without reducing the quantity of the cooling air.

Blades 111, 141 have a curved surface having a portion that directs in the direction opposite the rotation direction more as the portion is located radially outward, the cooling air of cooling fans 11, 14 can be made smooth. In particular, inclination angle α1 of the outer edge of blades 111, 141 to the radial direction and inclination angle α2 of the inner edge of blades 111, 141 are between 63° and 74° to reduce the collision loss at the entrance edge of the blades and to improve the fan efficiency η expressed by theoretical adiabatic aerodynamic force/shaft-driving power.

Figure 13:
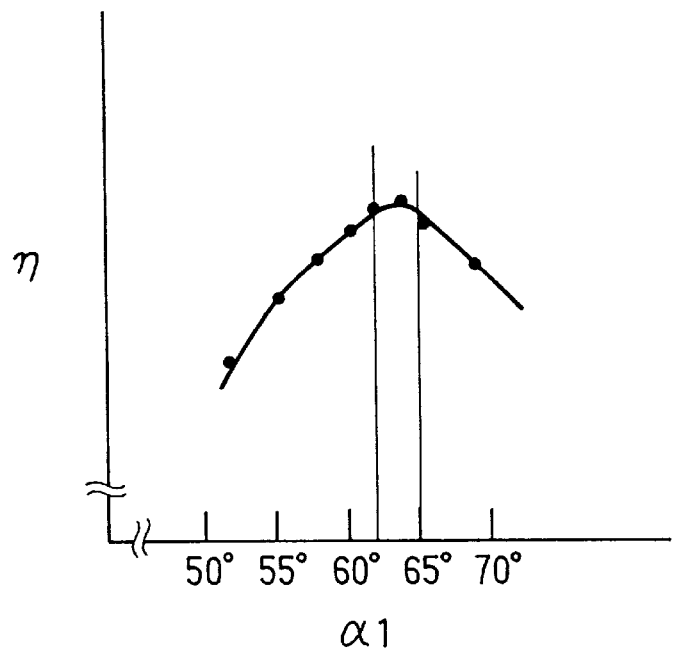
FIG. 13 is a graph showing relationship between inclination angles of the outer edge of the blades relative to the radial direction and fan efficiencies.
Figure 14:
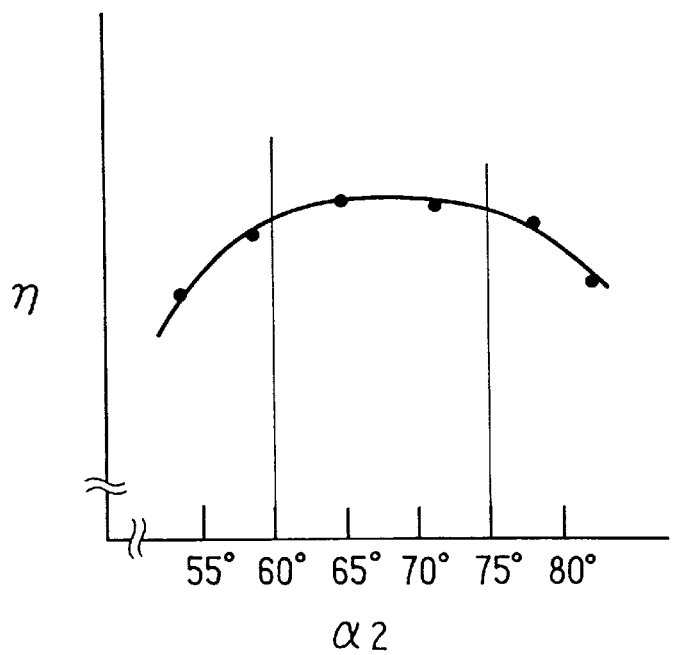
FIG. 14 is a graph showing relationship between inclination angles of the inner edge of the blades relative to the radial direction and fan efficiencies.

FIG. 13 shows variations of the fan efficiency η at various inclination angles α1 with the inclination angle α2 being unchanged. FIG. 14 shows variations of the fan efficiency η when the inclination angle α1 is 63° and the inclination angle α2 is changed.

It is noted from FIGS. 13 and 14 that high efficiency η can be obtained when the inclination angle α1 is between 62° and 65° and the inclination angle α2 is between 60° and 75°.

None of blades 111, 141 and base members 112, 142 has conventional rib 115 shown in FIG. 20, and turbulent flow may not be generated to assure smooth air flow.

Cooling fans 11, 14 have the same blades 111, 114 in shape, and the pressure change caused by the blades is the same, so that the air flow around fans 11 and 14 can be made smooth. Base member 142 of fan 14 has a cross-section of a large curvature and cylindrical bell-mouth 113 protruding toward intake windows 51 of frame 5. Accordingly, the axial air flow from intake air windows 51 is guided to flow radially to form smooth radial flow. Thus, the turbulent can be prevented from forming around blades 141.

Because the cylindrical coil-end group functions like the mesh-type windscreen covering a microphone, the noise caused by fans 11, 14 can be screened effectively.

Because the flat surface of base members 112, 142 increase, the number of choices of electrode and tools for welding or fixing of fans 11 and 14 to pole cores 7 increase, thereby reducing production cost.

The interference of the conductors of different phase coils at coil ends 31 can be eliminated, and conductor segments 33 can be disposed deep in slots 35. Therefore, a high space factor of the conductors can be provided.

Second embodiment

Figure 15:
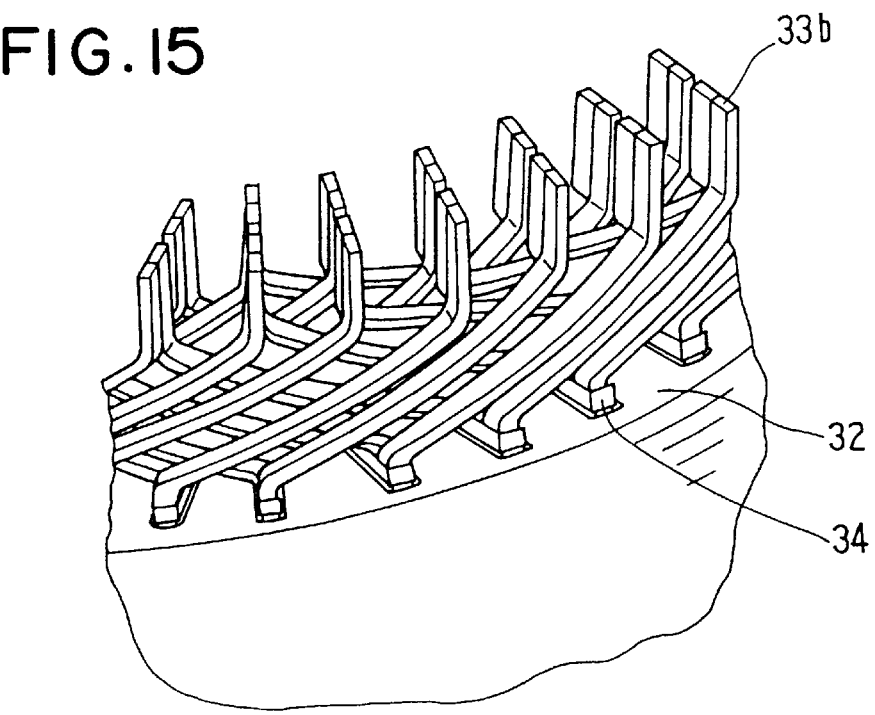
FIG. 15 is a fragmentary perspective view of the stator according to a second embodiment of the invention.

The number of conductors in each of slots 35 can be more than two as shown in FIG. 15, where a stator has four conductors in each of the slots. This structure provides the mesh-pattern in a plurality of layers to reduce the fan noise.

Third Embodiment

Figure 16:
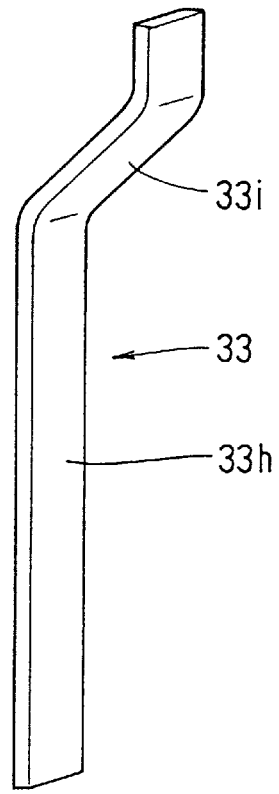
FIG. 16 is a perspective view of conductor segments of an alternator according to a third embodiment of the invention.

J-shaped conductor segments as shown in FIG. 16 can be inserted in the axial direction of stator core 32 instead of U-shaped conductor segments. The connection is carried out on opposite ends of stator core 32 to form the stator coil. Because of the simple conductor segments, production cost is low, and production facilities can be provided at low cost.

Fourth Embodiment

Figure 17:
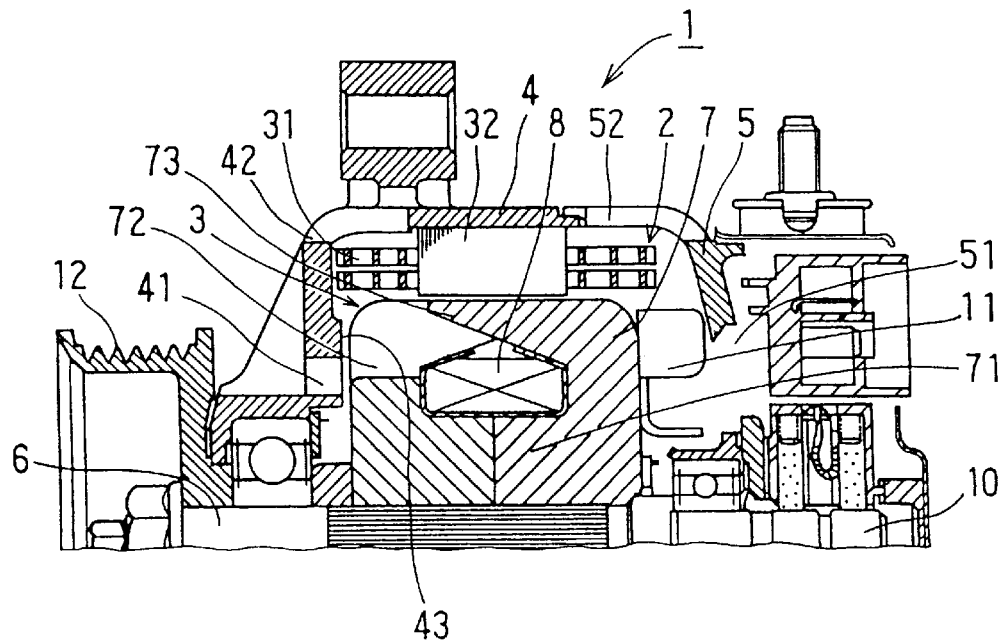
FIG. 17 is a cross-sectional view of a main portion of an alternator according to a fourth embodiment of the invention.
Figure 18:
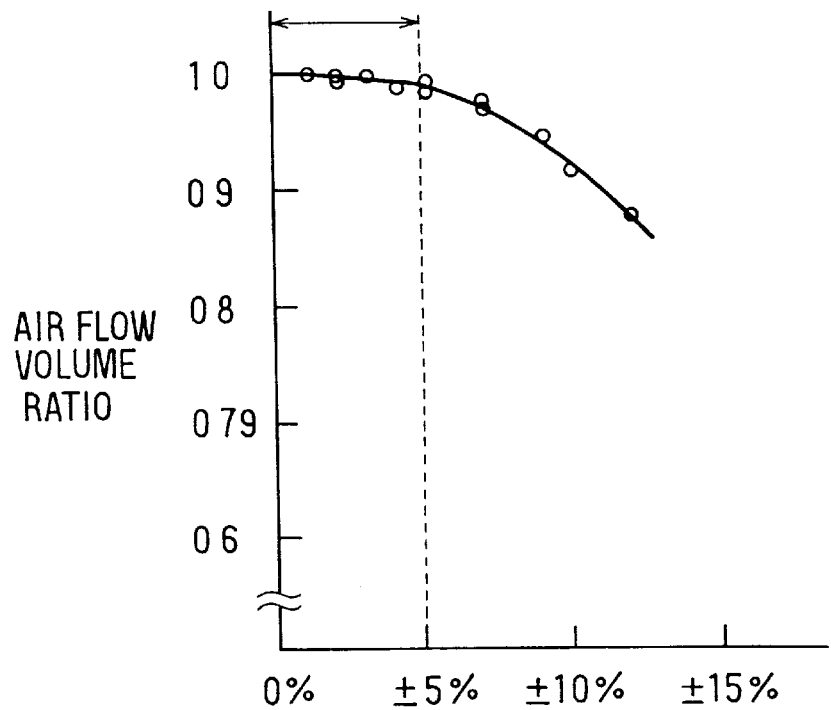
FIG. 18 is a graph showing relationship between tolerant variations of the angle between blades and air flow volume ratio.

One cooling fan can be omitted as shown in FIG. 17. In this case, inner wall 43 protrudes, as a fan shroud, from a portion of the front frame around intake windows 41 toward the fan-less-end-surface of rotor 3 so that disk portion 72 of pole cores 7 can function as a fan. Thus, the air-cut noise, the number of parts, and the number of manufacturing steps are reduced.

Variations

Angles θ and ψ between the blades of cooling fans 11 and 14 of the first embodiment can have tolerance of ±5%. The tolerance of ±5% can be provided intentionally.

If a half or more of the blades are disposed in the same manner as the first embodiment, the remaining blades can be disposed otherwise on the end surface of disk. It is not necessary for all blades 111, 141 to have the width of more than 30% of the outside diameter of the fans if some of blades 111, 141 have such a width. Blades 111, 141 can have a flat surface instead of the curved surface to reduce the air-cut noise if the width of the base portion of the blade is more than 30% of the outside diameter of the blades.

Instead of blades 141 of the first embodiment, blades that extend perpendicularly to base member 142 like blades 111 of fan 11 can be used. Fans 11, 14 can be made of resinous material instead of a metal plate.

Although the outside diameter of pole core 7 of the first embodiment is 91 mm, the outside diameter can be between 70 mm and 140 mm if the number of the blades and the outside diameter thereof are decided according to the invention.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An alternator for a vehicle including a field rotor having a pair of pole cores with a plurality of claw poles, a stator disposed around said rotor, and a frame for supporting said rotor and said stator, said frame has a plurality of air intake windows at axial ends thereof and a plurality of air discharge windows at circumferential portions thereof, said alternator further including means for supplying cooling air when said rotor rotates, wherein said means has a cooling fan with a plurality of fan blades disposed at one end of said pair of pole cores, and the number of said blades is smaller than the number of said claw poles of said one of the pole cores.

2. The alternator as claimed in claim 1, wherein said cooling fan has a base member fixed to the axial end of one of said pair of pole cores, said base member and said blades have no rib, and the outside diameter of said blades is smaller than the outside diameter of said pair of pole cores.

3. The alternator as claimed in claim 1, wherein said cooling fan has a base member fixed to the axial end of one of said pair of pole cores, and said base member has a cylindrical bell-mouth portion protruding toward said air intake windows.

4. The alternator as claimed in claim 1, wherein said stator has a cylindrical coil-end group composed of a plurality of coil ends disposed in a circumferential line spaced apart from one another, thereby providing a plurality of circumferential cooling passages.

5. An alternator for a vehicle including a field rotor having a pair of pole cores with a plurality of claw poles, a stator disposed around said rotor, and a frame for supporting said rotor and said stator, said frame has a plurality of air intake windows at axial ends thereof and a plurality of air discharge windows at circumferential portions thereof, said alternator further including means for supplying cooling air when said rotor rotates, wherein said means has a cooling fan with a plurality of fan blades disposed at one end of said pair of pole cores, the number of said blades is smaller than the number of said claw poles of said one of the pole cores, each of said blades has a curved surface which inclines more to the counter-rotating direction as said curved surface extends radially outward and a base portion, and width of said base portion is more than 30% of the outside diameter of said blades.

6. The alternator as claimed in claim 5, wherein inclination angle of the radially outer edge of said blade to a radial direction is between 62° and 65° in angle, and inclination angle of the radially inner edge of said blades to a radial direction is between 60° and 75° in angle.

7. An alternator for a vehicle comprising:

a rotor having a pair of magnetic pole cores with a plurality of claw poles and a cooling fan with a plurality of fan blades disposed at one end of said pair of pole cores, the number of said blades being smaller than the number of said claw poles of said one of said pole cores, each of said blades having a curved surface which inclines more to the counter-rotating direction as said curved surface extends radially outward and a base portion with width being more than 30% of the outside diameter of said blades;

a stator disposed around said rotor; and a frame for supporting said rotor and said stator.

8. An alternator for a vehicle comprising:

a rotor having a pair of magnetic pole cores with a plurality of claw poles and a cooling fan with a plurality of fan blades disposed at one end of said pair of pole cores, the number of said blades being smaller than the number of said claw poles of said one of said pole cores, each of said blades having a curved surface and a base portion with width being more than 30% of the outside diameter of said blades;

a stator disposed around said rotor, said stator comprising a cylindrical coil-end group having a mesh pattern; and a frame for supporting said rotor and said stator, said frame having a plurality of air intake windows at axial ends thereof and a plurality of air discharge windows at circumferential portions opposite said coil-end group.

9. An alternator for a vehicle comprising:

a rotor having a pair of magnetic pole cores each of which has a plurality of claw poles, said rotor further having a cooling fan with a plurality of fan blades at one end of said pole core, the number of said blades being smaller than the number of said claw poles of said one of said pole cores, each of said blades having a curved surface which inclines more to the counter-rotating direction as said curved surface extends radially outward, radially outer edge extending in a direction by an angle between 62° and 65° to a radial direction, and radially inner edge extending in a direction by an angle between 60° and 75° to a radial direction;

a stator disposed around said rotor, said stator comprising a cylindrical coil-end group having a mesh pattern; and a frame for supporting said rotor and said stator, said frame having a plurality of air intake windows at axial ends thereof and a plurality of air discharge windows at circumferential portions opposite said coil-end group.

10. An alternator for a vehicle including a rotor, a stator having air intake windows at axial ends thereof, and a frame for supporting said rotor and said stator, said rotor comprising:

a pair of magnetic pole cores each of which has a plurality of claw poles; and a cooling fan having a plurality of fan blades disposed at one end of said pair of pole cores, the number of said blades being smaller than the number of said claw poles of said one of said pole cores, each of said blades having a curved surface which inclines more to the counter-rotating direction as said curved surface extends radially outward and a base portion having a cylindrical bell-mouth portion protruding toward said air intake windows.

11. The alternator as claimed in claim 10, wherein said base portion has a width more than 30% of the outside diameter of said blades.

12. The alternator as claimed in claim 10, wherein each of said blades has radially outer edge extending in a direction by an angle between 62° and 65° to a radial direction, and radially inner edge extending in a direction by an angle between 60° and 75° to a radial direction.

* * * * *